Figure 3:
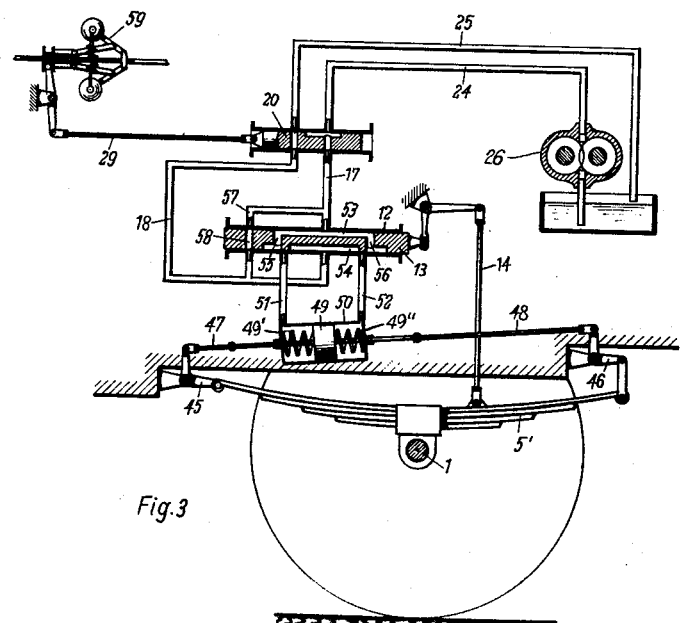

Aug. 24, 1954     F. K. H. NALLINGER     2,687,311
DEVICE FOR REGULATING THE VERTICAL LEVEL OF MOTOR VEHICLES
Filed Dec. 20, 1950     3 Sheets-Sheet 1
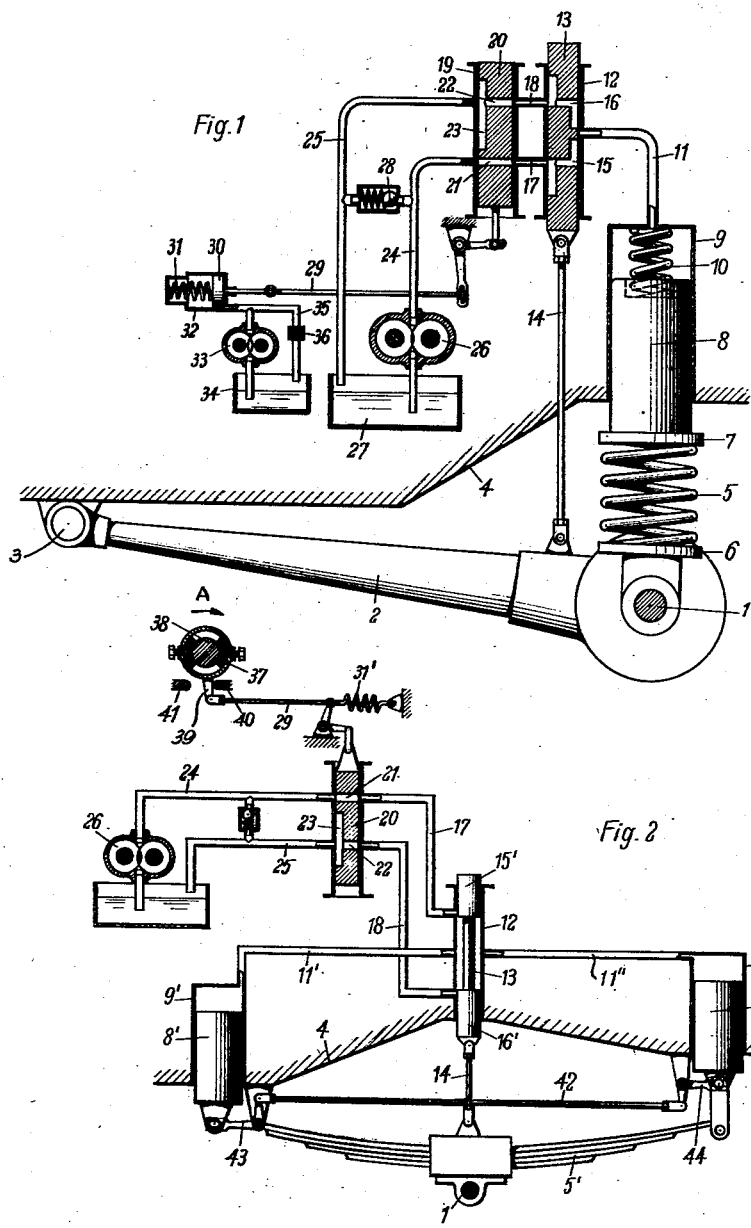
INVENTOR
FRIEDRICH K. H. NALLINGER
By:
Hazeltine, Lake & Co.
AGENTS Aug. 24, 1954    F. K. H. NALLINGER    2,687,311
DEVICE FOR REGULATING THE VERTICAL LEVEL OF MOTOR VEHICLES
Filed Dec. 20, 1950    3 Sheets-Sheet 2

INVENTOR
FRIEDRICH K. H. NALLINGER
BY:
Haseltine, Lake & Co.
AGENTS

Patented Aug. 24, 1954

2,687,311

UNITED STATES PATENT OFFICE 2,687,311

DEVICE FOR REGULATING THE VERTICAL LEVEL OF MOTOR VEHICLES

Friedrich K. H. Nallinger, Stuttgart, Germany, assignor to Daimler-Benz Aktiengesellschaft, Stuttgart-Unterturkheim, Germany Application December 20, 1950, Serial No. 201,809

12 Claims. (Cl. 280—124)

The invention refers to a device for regulating the vertical level of motor vehicles, particularly for keeping the distance between the bottom of the car body and the road surface constant under all loads of the vehicle.

One object of the invention is a device for automatic regulating of this distance. A further object of the invention is furthermore a device, which effects a balancing of the vertical level only or for the main part only during stopping of the car, however, while preventing it when the car is in motion.

The invention is of particular importance for passenger vehicles, which are designed for a larger number of passengers, i. e. above all for omnibuses, in which the changing vertical level or height of entrance creates great unpleasantness as a result of different axle loads, for example between empty and fully loaded omnibus.

The invention is furthermore of particular importance, when the vehicle is provided with a soft spring suspension, which is particularly suitable for achievement of agreeable springing properties.

Further objects of the invention refer to the suitable utilization and guidance of an auxiliary power mechanism for the automatic regulating of the vertical level of the vehicle.

The guidance for balancing or for blocking and releasing the balancing can be effected mechanically, hydraulically, pneumatically, electrically, or in any other suitable manner. The balancing can according to further characteristics of the invention also be effected by displacement of spring abutments or by a suitable arrangement by displacement of journal bearings.

Through the invention the advantage is achieved that the balancing of the vertical level does not require operation by the driver, so that the latter is not involved in addition to his other duties and the balancing of the vertical level does not depend on his attention.

If the balancing of the vertical level takes place only when the vehicle stops, during the driving a permanent up and down pendulum motion will not take place as a result of the permanently changing springing conditions.

Figure 4:
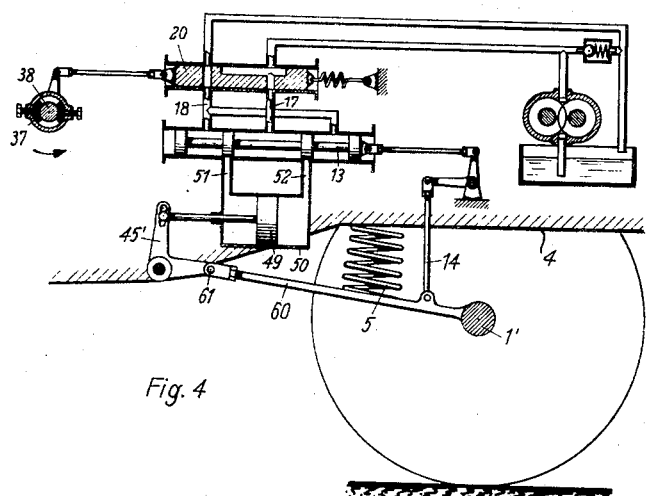
Figure 5:
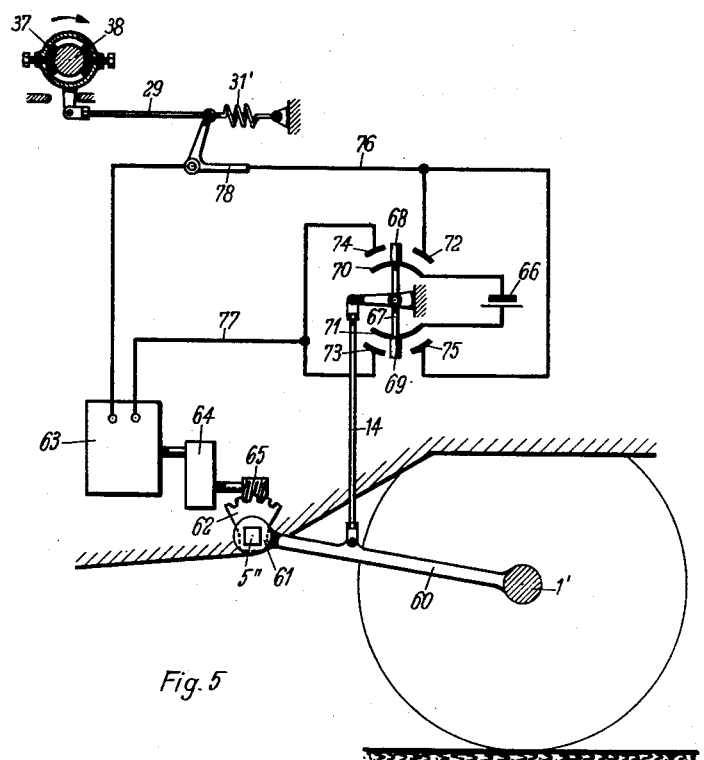
Figure 1A:
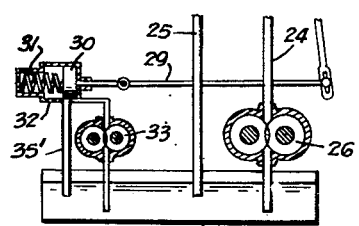

Further details and characteristics of the invention will be made clear from the examples of construction, which are described hereafter with reference to the accompanying drawings which show:

In Figure 1, a device for balancing the vertical level of a vehicle by hydraulic displacement of the spring abutment, which supports the springing against the vehicle superstructure, wherein the blocking and releasing of the balancing is also effected hydraulically; in Figure 1a, a modification of the device of Figure 1;

In Figure 2, a device in which the two spring abutments of a laminated spring are displaced hydraulically simultaneously with blocking and releasing of the balancing by a friction ring, which is arranged on a driving shaft;

In Figure 3, a device with hydraulic displacement of the two spring abutments of a laminated spring by a joint piston and with blocking and releasing of the balancing by a speed regulating device;

In Figure 4, another suspension of the axle according to the present invention; and In Figure 5, an axle suspension with torsional rod springing and electrically guided mechanical displacement of the spring abutment, which is arranged on the vehicle superstructure.

In the example of construction in accordance with Figure 1 the rigid axle 1 is for example universally jointed at 3 to the frame 4, for example by means of a shearing tube 2. The lateral guidance of the axle can be effected optionally in a known manner. For suspension of the axle against the frame for example provision is made for one helical spring 5 on each side of the vehicle. The spring in its turn is supported at one end against an abutment 6 on the axle and at the other end against an abutment 7 on the frame. The abutment 7 is arranged on a piston 8, which can slide in a cylinder 9, wherein a relatively weak spring 10 supports the piston against the cylinder.

The cylinder 9 is connected by piping 11 with a slide valve 12, in which a valve member 13 can move up and down, which is in connection with the axle 1 by a rod 14 and moves vertically therewith. In the valve member 13 control grooves 15 and 16 are arranged, which are in connection through pipes 17 and 18 with a slide valve 19, in which a further valve member 20 is movable. The latter has transverse control grooves 21 and 22, the control groove 22 being additionally connected with a longitudinal control groove 23.

The pressure pipe 24 and the return pipe 25 branch off from the slide valve 19. In the pressure pipe 24 arrangement is made for a pump 26, which is driven for example by the engine or permanently during engine or vehicle operation (i. e. also when the vehicle is standing), and which sucks in a pressure liquid, for example lubricating oil or the like, from a sump 27 and conveys it to the slide valve 19. The pipe 25 leads back to the sump 27 and is in connection with the pressure pipe 24 through a relief valve 28.

The valve member 20 is connected by rods 29 with a piston 30, which is influenced on one side by a spring 31 and on the other side by a pressure liquid conveyed into the cylinder space 32 by the pump 33. The pump 33 is for example driven by the axle driving shaft of the vehicle, for example by the universal, which drives the axle 1. The pressure liquid is sucked in from a sump 34 (which can also be the sump 27). In a return pipe 35 a narrow throttle 36 is arranged, through which the liquid can flow off, as far as it is not pressed into the cylinder 32.

The manner of operation of the device so far described is the following: As long as the car is standing, the pump 33 is inactive. The liquid, which, if occasion arises, is already under pressure in the cylinder 32, can flow off into the sump 34 through the pipe 35 and the throttle 36. The piston 30 is then in its right final position and thereby the valve member 20 in its upper final position. The pressure liquid is conveyed by the pump 26 through the pipe 24, the control boring 21 in the valve member 20 and from there through the pipe 17 to the control groove 15 in the valve member 13.

If the axle 1 is in the drawn position, i. e. the position, which corresponds to the normal vertical level of the car body, the pressure liquid is prevented by the valve member 13 from flowing to the pipe 11 which is separated from the control boring 15. The pressure liquid is therefore displaced into the return pipe 25 through the relief valve 28. The pressure liquid, which is in the cylinder 9, is locked in the cylinder by the piston 8 and cannot flow off towards the outside, since also the control groove 16 is separated from the pipe 11.

If the load of the vehicle changes, for example through increase of the load, the frame 4 has the tendency to lower itself, or the axles have the tendency to raise themselves relatively to the frame. This has as a consequence that the valve member 13 is also lifted and thereby the pipe 11 is brought into connection with the control groove 15. The pump 26 conveys therefore now the pressure liquid through the pipe 11 into the cylinder 9, so that, under the supposition of an appropriate dimension of the piston 8, or an appropriate spring-force of the relief valve 28, the piston 8 with the spring abutment 7 is displaced downward, until the control groove 15 is again separated from the pipe 11 and the original vertical level is reached again.

If conversely upon discharging of the vehicle and thereby discharging of the spring 5 the valve member 13 is displaced downward, the liquid, which is locked in the cylinder 9, can flow off through groove 16, pipe 18 and groove 22 into the return pipe 25, until the original relative normal position between axle and frame is reached again. The manner of operation described above can, however, only be effective as long as the valve member 20 occupies the position illustrated, i. e. the piston 30 is in its right final position. When, however, the vehicle starts to move and thereby the pump 33 is driven, the piston 30, either immediately after starting or upon reaching a given number of revolutions of the pump 33, is displaced to the left against the effect of the spring 31 and thereby the valve member 20 is displaced downward. The connection between the pressure pipe 24 and the pipe 17 as well as between the return pipe 25 and the pipe 18 is interrupted. Simultaneously for example the pressure pipe is brought into connection with the return pipe 25 through the longitudinal groove 23. The displacement of the valve member 20 has as a consequence that now the relative movement between the axle 1 and the frame 4, i. e. the upward and downward movement of the valve member 13 is without effect on the balancing of the vertical level, since the liquid in the cylinder 9 is locked and can neither stream into nor stream out of it.

In the embodiment according to Figure 1a, both pumps 26 and 33 draw fluid from the same sump 27. In place of the by-pass 35 and throttle 36, there is provided a discharge pipe 35' controlled by the piston 30 to discharge fluid from the cylinder 32 when uncovered by the piston 30 as it completes a predetermined stroke to the left, i. e. in the direction of downward actuation of the valve member 20 shown in Figure 1.

In the example of construction in accordance with Figure 2 the axle 1 is suspended by a leaf spring 5', the ends of which are supported on the frame by means of the pistons 8' and 8". The two pistons are vertically movable in the cylinders 9' and 9" which are in communication with the slide valve 12 through pipes 11' and 11". In the slide valve 12 the valve member 13, which is connected with the axle 1 by the rods 14, slides with the pistons 15' and 16', which control the pipes 17 and 18. The control in dependence upon the driving operatin is in this case effected by a friction ring 37, which is in slight, for example elastic frictional coupling with the driving shaft 38, and the lever arm 39 of which is drawn against a stop 40 by the rod 29 and a return spring 31', as long as the driving shaft 38 stands still or turns for example backward contrary to the direction of the arrow A. If the vehicle is driven in forward drive, i. e. the shaft 38 is driven in the direction of the arrow A, the friction ring is taken along in the direction of rotation, until the lever arm 39 abuts against a second stop 41. Through this movement of the friction ring 37 the valve member 20 is moved upward by means of the rod 29, which has as a consequence that the connection between the pressure pipe 24 and the pipe 17 on one hand as well as between the pipe 18 and the return pipe 25 on the other hand is interrupted. An upward and downward movement of the axle 1 and thereby of the valve member 13 has consequently no longer any effect on the position of the pistons 8' and 8".

If, however (as supposed in the drawing), the vehicle and thereby the shaft 38 are at rest, a relative upward movement of the axle 1 as a result of heavier load on the vehicle, will bring pressure pipe 24, 17 into connection with the pipes 11' and 11", so that the pressure liquid can flow into the cylinders 9' and 9" until the original vertical position of the vehicle frame 4 is reached. Inversely, a relative downward movement of the axle, as a result of an unloading of the car, will bring the pipes 11' and 11" in communication with the return pipe 18, so that the pressure liquid can escape from the cylinders 9' and 9" until the axle 1 and thereby the valve member 13 occupy again the illustrated relative position.

In order to guarantee at all times a uniform movement of the pistons 8' and 8" and to prevent thereby a tilting of the axle 1 around the axis of rotation of the wheels, provision is made for a balancing device between the two pistons 8' and 8". In the example of construction in accordance with Figure 2 the balancing device comprises a rod 42, which is connected in an appropriate manner to the pistons 8' and 8" by means of bell-crank levers 43 and 44, which are pivoted on the frame. If one of the two pistons moves upward or downward, also the other piston is moved upward or downward correspondingly in a guided manner through the balancing device.

In the example of construction in accordance with Figure 3 the leaf spring 5' is suspended on bell-crank levers 45 and 46 mounted on the frame. The free ends of the levers are connected to a piston 49 by means of rods 47, 48, which piston moves, for example against two springs 49' and 49", in a cylinder 50. The cylinder 50 is through pipes 51 and 52 in connection with the slide valve 12, into which furthermore a pressure pipe 17 and a return pipe 18 discharges. In the slide valve 12 the valve member 13 is arranged, which has a longitudinal groove 53, which is in permanent connection with the pipe 17, and a longitudinal groove 54, which is in permanent connection with the pipe 18. From the longitudinal groove 53 transverse bores 55 and 56 branch off.

The longitudinal groove 54 and the transverse bores 55, 56 are arranged in such a manner that upon upward movement of the axle 1 relatively to the frame or upon displacing of the valve member 13 to the right the pressure pipe 17 is brought into connection with the pipe 51 through the transverse bore 55 and the pipe 18 is brought into connection with the pipe 52 through the longitudinal groove 54. This has as a consequence that the piston 49 is pressed to the right and that the leaf spring 5' or the axle 1 is displaced downward relatively to the frame through the bell-crank levers 45, 46, i. e. until the valve member 13 is guided back into its mean illustrated position, in which the pipes 51, 52 are separated again from the pipes 17 and 18. Between the pipes 17 and 18 furthermore provision is made for a by-pass pipe 57, which in the illustrated mean position of the valve member 13 is opened by a control bore 58, so that the oil, which is conveyed by the pump 26, can flow back throttle-free into the return pipe 25. Upon displacement of the valve member 13 to the right or to the left, however, the pipe 57 is throttled or blocked entirely.

The displacement can also in this case be effected only when the vehicle is at rest, since upon drive of the vehicle, as in the examples of constructions described before, the valve member 20 again interrupts the conduit or return pipe of the pressure liquid. The control is in this case effected by a speed regulating device 59 of any type, which is for example arranged on the vehicle drive shaft and adjusted in such a manner that it becomes effective already at a small number of revolutions. This arrangement has the advantage that the blocking of the balancing of the vertical level takes place both for forward and for backward drive.

In the example of construction in accordance with Figure 4 the wheels are guided independently from each other, for example by means of a rocking lever 60. The suspension is for example effected by a helical spring 5, which is interposed between the rocking lever 60 and the frame 4. The rocking lever 60 rests by means of a pivot 61 on a bell-crank lever 45', which is connected with the piston 49 in the cylinder 50. The piston 49 is controlled in a similar manner to that of Figure 3 by a valve member 13 in such a manner that the pipes 51 and 52 are alternately brought into connection with the pressure pipe 17 or 18 by the valve member 13, when the valve member 13 is displaced to the right or to the left by the rods 14. If for example the axle 1' of the wheel moves upward relatively to the frame, pressing the spring 5 together, for example as a result of an increased load on the vehicle, the valve member 13 is displaced to the right, which has as its consequence that the pipe 17 is brought into connection with the pipe 52, the piston 49 is displaced to the left and thereby the pivot point 61 of the rocking lever 60 is displaced upward. The axle 1' will consequently move downward under the action of the spring 5 and thereby balance again the change of the vertical level of the frame 4 as a result of a heavier load on the vehicle, until the valve member 13 occupies again its illustrated mean position. Upon unloading of the vehicle an opposite movement of the vehicle axle 1' is effected.

In the example of construction in accordance with Figure 5 the rocking lever 60 is connected at its pivot 61 with one end of a torsion bar 5", which is illustrated diagrammatically in cross-section. The other end of the torsion bar is supported in an adjusting member, for example a toothed wheel segment 62, which can be adjusted by a worm 65, which is driven by an electromotor 63 through a transmission gear 64. The electromotor 63 is inserted in a circuit, for example with the source of current 66. In the circuit there is a change-over switch 67, which is operated by the rocking lever 60 through the rod 14, i. e. in such a manner that it interrupts the circuit in the illustrated normal position of the wheel. The change-over switch 67 is, as indicated in the drawing, for example provided with two wipers 68 and 69, which keep constant contact with the contact rails 70, 71, which are in their turn in connection with the power source. If the change-over lever is rotated in a clockwise direction (upon upward movement of the wheel), the wiper 68 enters into circuit closing connection with a contact piece 72 and the wiper 69 with a contact piece 73. Conversely upon a relative lowering of the wheel, connections are established by the wiper 68 between the contacts 70 and 74 and by the wiper 69 between the contacts 71 and 75. The contacts 72 and 75 are in conducting connection through a lead 76 with the one terminal of the motor 63 and the contacts 73 and 74 through a lead 77 with the other terminal of the electromotor.

At an optional place of the circuit furthermore a switch 78 is arranged, which is closed by the return spring 31' and opened by a friction ring 37 on the driving shaft 38 by means of the rod 29, as soon as the shaft 38 is driven upon forward drive of the vehicle.

The manner of operation of the arrangement in accordance with Figure 5 is the following:

When the vehicle is at rest the switch 78 is closed and the wheel and the rocking lever 60 occupy the positions shown. The circuit is interrupted by the switch 67, i. e. the electromotor is out of service.

If the wheel, for example as a result of a heavier load on the vehicle, deflects relatively to the frame in upward direction, the switch 67 is rotated in a clockwise direction Consequently the current flows from the power source 66 through the contact parts 71, 69, 73 and the lead 77 to the motor 63 and through the lead 76 as well as the contact parts 72, 68, 70 back to the power source 66. Hereby the electromotor 63 through the transmission gear 64 drives the worm 65 which is turned in a clockwise direction. This has as a consequence that through the torsion bar 5'' also the rocking lever is turned in the same direction, i. e. the wheel is pressed downward relatively to the frame, or the frame is brought again to the original bottom level, until the switch 67 takes again its mean neutral position.

If the vehicle is unloaded, so that the frame lifts, or the wheel lowers, relatively, the switch 67 causes the current to flow in the opposite direction, in that the contacts 70, 74 on one hand and 71, 75 on the other hand are brought into leading connection. The electromotor 63 is consequently now driven in reverse direction of rotation, which has also an appropriate drive of the worm segment 62 as a consequence. The wheel is lifted relatively to the frame, or the frame is lowered, until the original vertical level is reached again.

If the vehicle and thereby the driving shaft 38 is driven, the switch 78 opens and the circuit is interrupted in each case. A balancing of the vertical level can then no longer take place while the vehicle is in motion, but starts only then, when the shaft 38 comes to rest, and thereby the switch 78 is closed by the spring 31'.

In its nature the invention is not restricted to the illustrated and described examples of construction. The balancing can be effected or controlled not only in a hydraulic, mechanical or electrical manner but also in a pneumatic or any other manner. It is also possible to combine the details in each case of the different forms of construction with each other in a significant manner.

What I claim is:

1. A device for regulating the vertical level of motor vehicles, comprising, in combination, a vehicle chassis; a vehicle wheel; means connected to said chassis for guiding said wheel; resilient means for suspending said wheel relatively to said vehicle chassis; an auxiliary power mechanism connected to said chassis, said auxiliary power mechanism including an auxiliary power generator, a device adapted to change the relative position of said wheel with reference to said chassis in vertical direction, and a system of conductors for the auxiliary power, said system being arranged between said auxiliary power generator and said device adapted to change the relative position of said wheel with reference to said chassis in vertical direction; a first control mechanism for the auxiliary power mechanism, said first control mechanism being arranged in said system of conductors in the path of the auxiliary power; means for actuating said first control mechanism in dependence upon the relative position of said wheel and said chassis; a second control mechanism for said auxiliary power mechanism, said second control mechanism being arranged in said system of conductors in series with said first control mechanism; and means for actuating said second control mechanism in dependence on the driving condition of the vehicle, said means for actuating said second control mechanism interrupting the flow of the auxiliary power within said auxiliary power mechanism when the vehicle is moving.

2. A device for regulating the vertical level of motor vehicles, comprising, in combination, a vehicle chassis; a vehicle wheel; driving means for the vehicle; means connected to said chassis for guiding said wheel; resilient means for suspending said wheel relatively to said vehicle chassis; an auxiliary power mechanism connected to said chassis, said auxiliary power mechanism including an auxiliary power generator, a device adapted to change the relative position of said wheel with reference to said chassis in vertical direction, and a system of conductors for the auxiliary power, said system being arranged between said auxiliary power generator and said device adapted to change the relative position of said wheel with reference to said chassis in vertical direction; a first control mechanism for said auxiliary power mechanism, said first control mechanism being arranged in said system of conductors in the path of the auxiliary power; means for actuating said first control mechanism in dependence upon the relative position of said wheel and said chassis in such a manner that said auxiliary power mechanism returns said chassis upon springing motion thereof to a relative mean position; a second control mechanism for the auxiliary power mechanism, said second control mechanism being arranged in said system of conductors in series with said first control mechanism; and means for actuating said second control mechanism in dependence on the driving condition of the vehicle, said means for actuating said second control mechanism interrupting the flow of the auxiliary power within said auxiliary power mechanism when the vehicle is moving.

3. A device in accordance with claim 2, wherein the second mentioned control mechanism comprises a pressure producing device, a drive connection between the device and the driving means, a device responsive to the pressure produced by the aforementioned device and a control member operated by said responsive device for actuating the auxiliary power mechanism.

4. A device in accordance with claim 2, wherein the second mentioned control mechanism comprises a coupling member, including means for coupling thereof with the driving means in a power transmitting manner, means limiting the movement of the member in one direction when driven by the driving means, means for returning the coupling member when not so driven, and a control member connected with the coupling member for actuating the auxiliary power mechanism in such a manner that when the coupling member is driven the regulating effect of the auxiliary power mechanism is cancelled, and when it is not driven the regulating effect is positive.

5. A device in accordance with claim 2, wherein the second mentioned control mechanism comprises a speed regulating device, which is driven by the driving means, and a control member driven by the latter for actuating the auxiliary power mechanism in such a manner that upon exceeding a certain low number of revolutions of the driving means the regulating effect of the auxiliary power mechanism is cancelled.

6. A device in accordance with claim 2, wherein the auxiliary power mechanism comprises a cylinder, a piston sliding in the cylinder substantially in the springing direction of the wheel, a hydraulic pressure generator and a pipe system, which connects the pressure generator with the cylinder, wherein furthermore the two control mechanisms comprise at least one slide valve each, which are included in the pipe system.

7. A device in accordance with claim 2, wherein the auxiliary power mechanism comprises an electrical motor, a power source therefor, and a change-over-switch between the power source and the motor responsive to the relative movement of the wheel and chassis thereby to connect the motor with the source for actuation in the opposite direction.

8. A device for regulating the vertical level of motor vehicles, comprising, in combination, a vehicle chassis; a vehicle wheel; resilient means for suspending said wheel relatively to said chassis; a spring abutment for said resilient means, said spring abutment being displaceable in a springing direction; an auxiliary power mechanism including means for displacing said spring abutment in springing direction thereof; a first control mechanism for said auxiliary power mechanism, said first control mechanism displacing said springing abutment in dependence upon the relative position of said vehicle wheel and said chassis, said first control mechanism being arranged in the path of the auxiliary power generated by said auxiliary power mechanism; a second control mechanism arranged in the path of the auxiliary power in series with said first control mechanism; and means for actuating said second control mechanism in dependence upon the driving condition of the vehicle, said means for actuating said second control mechanism interrupting the flow of the auxiliary power within said auxiliary power mechanism when the vehicle is moving.

9. A device for regulating the vertical level of motor vehicles, comprising, in combination, a vehicle chassis; a vehicle wheel; a guide member for guiding said wheel with reference to said chassis; resilient means for suspending said wheel relatively to said chassis; means for supporting said guide member against said chassis; an auxiliary power mechanism including means for displacing said supporting means of said guide member; a first control mechanism for said auxiliary power mechanism, said first control mechanism displacing said supporting means in dependence upon the relative position of said vehicle wheel on said chassis; a second control mechanism arranged in the path of the auxiliary power in series with said first control mechanism; and means for actuating said second control mechanism in dependence upon the driving condition of the vehicle, said means for actuating said second control mechanism interrupting the flow of the auxiliary power within said auxiliary power mechanism when the vehicle is moving.

10. A device in accordance with claim 1, wherein the auxiliary power mechanism comprises a hydraulic auxiliary power system and is connected to the chassis, and the first mentioned control mechanism comprises a first control part connected with the chassis, and a second control part connected with the wheel and cooperating with the first control part to supply fluid to the hydraulic auxiliary power system.

11. A device for regulating the vertical level of a vehicle, comprising, in combination, a vehicle chassis; a vehicle wheel; a guide element for guiding said wheel relatively to said chassis; means for supporting said guide element at two points on one of said chassis and said wheel to be guided relatively to each other, said supporting means being displaceable; an auxiliary power mechanism for displacing said supporting means in dependence upon the relative position of said wheel and said chassis to each other; balancing means rendering positively uniform the displacement of said supporting means; and a control mechanism for said auxiliary power mechanism, said control mechanism being arranged in the path of the auxiliary power and being actuated so as to interrupt the flow of the auxiliary power within said auxiliary power mechanism when the vehicle is moving.

12. A device in accordance with claim 11, wherein the guide element is a leaf spring.

References Cited in the file of this patent

UNITED STATES PATENTS

| Number | Name | Date |
|---|---|---|
| 1,073,840 | Bejar | Sept. 23, 1913 |
| 1,585,833 | Down | May 25, 1926 |
| 1,632,728 | Drennan | June 14, 1927 |
| 1,816,075 | Down | July 28, 1931 |
| 2,191,211 | Krotz | Feb. 20, 1940 |
| 2,490,311 | Du Rostu | Dec. 6, 1949 |

FOREIGN PATENTS

| Number | Country | Date |
|---|---|---|
| 300,994 | Great Britain | Feb. 10, 1930 |